United States Patent
Ladd et al.

(10) Patent No.: US 8,302,111 B2
(45) Date of Patent: Oct. 30, 2012

(54) METHODS AND APPARATUS FOR HARDWARE REGISTRATION IN A NETWORK DEVICE

(75) Inventors: Patrick Ladd, San Marcos, CA (US); George W. Sarosi, Charlotte, NC (US)

(73) Assignee: Time Warner Cable Inc., New York, NY (US)

( * ) Notice: Subject to any disclaimer, the term of this patent is extended or adjusted under 35 U.S.C. 154(b) by 2479 days.

(21) Appl. No.: 10/723,959

(22) Filed: Nov. 24, 2003

(65) Prior Publication Data
US 2005/0114900 A1 May 26, 2005

(51) Int. Cl.
G06F 9/44 (2006.01)
H04N 7/16 (2006.01)

(52) U.S. Cl. .......................................... 719/328; 725/2

(58) Field of Classification Search ............... 348/14.02, 348/14.04; 707/3; 719/328; 725/38, 39, 725/87, 88, 101, 114, 2
See application file for complete search history.

(56) References Cited

U.S. PATENT DOCUMENTS

| | | | |
|---|---|---|---|
| 5,664,046 A | 9/1997 | Abecassis | |
| 6,169,725 B1 | 1/2001 | Gibbs et al. | |
| 6,192,403 B1 | 2/2001 | Jong et al. | |
| 6,233,611 B1 | 5/2001 | Ludtke et al. | |
| 6,317,881 B1 | 11/2001 | Shah-Nazaroff et al. | |
| 6,330,010 B1 | 12/2001 | Nason et al. | |
| 6,337,717 B1 | 1/2002 | Nason et al. | |
| 6,469,742 B1 | 10/2002 | Trovato et al. | |
| 6,510,152 B1 | 1/2003 | Gerszberg et al. | |
| 6,529,965 B1 | 3/2003 | Thomsen et al. | |
| 6,542,500 B1 | 4/2003 | Gerszberg et al. | |
| 6,546,016 B1 | 4/2003 | Gerszberg et al. | |
| 6,600,958 B1 | 7/2003 | Zondag | |
| 6,625,274 B1 | 9/2003 | Hoffpauir et al. | |
| 6,630,943 B1 | 10/2003 | Nason et al. | |
| 6,714,534 B1 | 3/2004 | Gerszberg et al. | |
| 6,850,533 B2 | 2/2005 | Gerszberg et al. | |
| 6,948,183 B1 * | 9/2005 | Peterka ........................... 725/25 |
| 6,968,364 B1 * | 11/2005 | Wong et al. .................... 709/217 |
| 7,058,964 B2 * | 6/2006 | Khandelwal et al. ........... 725/25 |
| 7,068,597 B1 * | 6/2006 | Fijolek et al. .................. 370/230 |
| 7,328,333 B2 | 2/2008 | Kawano et al. | |

(Continued)

FOREIGN PATENT DOCUMENTS

WO  WO 00/24192 A1 * 4/2000
WO  WO 0213039 A1    2/2002

OTHER PUBLICATIONS

Allen et al. "The case for Run-Time Types in Generic Java" Rice University 2002 pp. 1-6.*

(Continued)

*Primary Examiner* — Charles E Anya
(74) *Attorney, Agent, or Firm* — Gazdzinski & Associates, PC

(57) ABSTRACT

Methods and apparatus for control of a client device (e.g., consumer premises equipment in a cable network) using applications. In one aspect, an improved hardware registry is provided within the device with which the application(s) can interface to both identify and control available hardware resources. In one exemplary embodiment, the client device comprises a digital set-top box having digital video recording (DVR) capability. An application downloaded to the device discovers the registry and software interfaces associated therewith, and then utilizes the interfaces to automatically control the requisite hardware capability. Improved client device, network and head end configurations, as well as methods of operating these systems, are also disclosed.

16 Claims, 7 Drawing Sheets

U.S. PATENT DOCUMENTS

| | | | |
|---|---|---|---|
| 7,487,534 B1* | 2/2009 | Peterka et al. | 725/131 |
| 7,552,450 B1* | 6/2009 | Evans et al. | 719/328 |
| 2001/0049691 A1* | 12/2001 | Asazu | 707/104.1 |
| 2002/0038358 A1* | 3/2002 | Sweatt et al. | 709/218 |
| 2002/0044569 A1 | 4/2002 | Bernet et al. | |
| 2002/0174433 A1* | 11/2002 | Baumgartner et al. | 725/58 |
| 2003/0005454 A1 | 1/2003 | Rodriguez et al. | |
| 2003/0009769 A1* | 1/2003 | Hensgen et al. | 725/131 |
| 2003/0110511 A1 | 6/2003 | Schutte et al. | |
| 2003/0121055 A1 | 6/2003 | Kaminski et al. | |
| 2003/0163811 A1 | 8/2003 | Luehrs | |
| 2003/0204848 A1* | 10/2003 | Cheng et al. | 725/58 |
| 2003/0229899 A1* | 12/2003 | Thompson et al. | 725/87 |
| 2004/0003400 A1* | 1/2004 | Carney et al. | 725/42 |
| 2004/0103434 A1* | 5/2004 | Ellis | 725/58 |
| 2004/0187152 A1* | 9/2004 | Francis et al. | 725/58 |
| 2004/0261092 A1 | 12/2004 | Addington et al. | |
| 2004/0261114 A1 | 12/2004 | Addington et al. | |
| 2004/0261126 A1 | 12/2004 | Addington et al. | |

OTHER PUBLICATIONS

Motorola—DCT2000 Digital Consumer Terminal Installation Manual; 70 pgs.

Motorola—DCT5100 Digital Consumer Terminal Installation Manual; 81 pgs.

Scientific Atlanta Company Overview web pages, 3 pages, no date http://www.scientificatlanta.com/newscenter/iframe_companyoverview.htm.

Scientific Atlanta—Subscriber Products; Explorer® 8000™ Home Entertainment Server information pages; Nov. 2003; 4 pgs.

Scientific Atlanta—Subscriber Networks; Explorer® 3100HD High Definition DHCT information pages; Oct. 2001; 2 pgs.

Scientific Atlanta—Subscriber Networks; Explorer® 4200 Home Gateway information pages; Sep. 2003; 3 pgs.

OpenCable™ Host Device Core Functional Requirements Issued Specification (OC-SP-HOST-CFR-I14-030905), Sep. 5, 2003, 81 pages.

* cited by examiner

METHODS AND APPARATUS FOR HARDWARE REGISTRATION IN A NETWORK DEVICE

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of software applications used on an information network (such as a cable television network), and specifically to the management and control of various hardware and related functions within an electronic device connected to the network.

2. Description of Related Technology

Software applications are well known in the prior art. Such applications may run on literally any type of electronic device, and may be distributed across two or more locations or devices connected by a network. Often, a so-called "client/server" architecture is employed, where one or more portions of applications disposed on client or consumer premises devices (e.g., PCs, PDAs, digital set-top boxes {DSTBs}, hand-held computers, etc.) are operatively coupled and in communication with other (server) portions of the application. Such is the case in the typical hybrid fiber coax (HFC) or satellite content network, wherein user client devices (e.g., DSTBs or satellite receivers) utilize the aforementioned "client" portions of applications to communicate with their parent server portions in order to provide downstream and upstream communications and data/content transfer.

Digital TV (DTV) is an emerging technology which utilizes digitized and compressed data formats (e.g., MPEG) for content transmission, as compared to earlier analog "uncompressed" approaches (e.g., NTSC). The DTV content may be distributed across any number of different types of bearer media or networks with sufficient bandwidth, including HFC, satellite, wireless, or terrestrial. DTV standards such as the OpenCable™ Application Platform middleware specification (e.g., Version 1.0, and incipient Version 2.0) require that applications be downloaded to host devices from the bearer or broadcast network in real-time. The OCAP specification is a middleware software layer specification intended to enable the developers of interactive television services and applications to design such products so that they will run successfully on any cable television system in North America, independent of set-top or television receiver hardware or operating system software choices.

The aforementioned OpenCable project at www.opencable.com also sets forth a Host Core Functional Requirements specification which defines optional circuitry for digital video recorders (DVRs), and digital video interfaces (DVIs); see, e.g., the OpenCable Host Device Core Functional Requirements OC-SP-HOST-CFR-I13-030707 specification (now OC-SP-HOST-CFR-I14-030905 dated Sep. 5, 2003).

DVR technology provides selective recording, playback, and manipulation (e.g., storage, processing, editing, etc.) of digital format content. For example, the services offered by the Assignee hereof in conjunction with exemplary Scientific Atlanta Explorer 8000 Digital Video Recorder set top box equipment (and associated high capacity mass storage device) are representative of the state-of-the-art in this technology. This service offers, inter alia, the ability to store one or more items of content (e.g., movies or television programs) simultaneously with directly watching a second (or third) program.

Personal video recording (PVR) functionality is essentially a subset of DVR technology, wherein individual users, e.g., family members within the same household, can selectively record digital content particular to their choosing while not inhibiting other individuals from doing the same. This provides significant flexibility and enhances the user experience, since each individual can tailor their viewing as desired.

DVI technology allows, inter alia, for the seamless integration of digital TV and digital-based devices with analog devices, such as analog televisions. Accordingly, if the user possesses an analog monitor, the DVI selectively converts the otherwise digital signal to the analog domain. Accordingly, the user (and manufacturer) need not selectively tailor their equipment to a particular domain. A DVI output is an option in OpenCable compliant hardware that provides a high-definition TV (HDTV) output which includes copy protection. The aforementioned Core Functional Requirements specification details the DVI requirements, including (i) presence of a Digital (DVI-D) connector, which at a minimum supports the Single Link Transmission Minimized Differential Signaling as defined in Digital Display Working Group (DDWG) Digital Visual Interface (DVD revision 1.0; and (ii) that the DVI interface on the HD Host must employ the HDCP encryption system, as defined in the HDCP System specification.

Increasingly, consumer premises equipment (CPE) and other client devices are being equipped with DVR/PVR and DVI technology. This equipment may be leased from the content/network operator, or alternatively purchased "retail" from a third party manufacturer. Clearly, it is desired to have software applications distributed by the network operator (or third-party content provider) be universally compatible with the hardware/software environments of these CPE, thereby avoiding situations where a downloaded application does not function properly which greatly adds to user frustration.

Moreover, it is highly desirable to have these applications autonomously (i.e., without a requirement for significant MSO or user intervention) discover and control the various DVR, PVR, DVI, and other hardware/software options resident on any particular consumer installation. For example, in one scheme, the delivered application may be configured to operate at the level of the lowest common denominator in terms of equipment capability. However, without a "smart" capability in the application or CPE, the owner of the more capable CPE may be robbed of the opportunity to utilize the full capabilities of their CPE with the application in question. Hence, autonomous discovery and control of options on any given CPE would effectively allow an application to tailor itself (and/or its hardware environment) to obtain optimized performance, e.g., provide the user with the greatest amount of features and flexibility of usage.

Alternatively, it may be desirable to provide the MSO some degree of control over the application and its discovery of the various hardware/software options on a particular CPE installation.

Where a plurality of different hardware/software options or devices are present with a given system, a registry is typically used to manage the various functional aspects of the operation of these options. As is well known, a registry in effect comprises a repository or database of information relating to the various options. For example, in the context of computer software, the well known Windows® O/S utilizes a registry for management of various functions within the operating system.

A variety of different approaches to controlling the operation of content-based software on client devices (e.g., CPE) using registries are taught in the prior art. For example, U.S. Pat. No. 6,169,725 to Gibbs, et al. issued Jan. 2, 2001 and entitled "Apparatus and method for restoration of internal connections in a home audio/video system" discloses an apparatus and method for the management and restoration of internal connections of consumer electronic devices in a home audio/video network. Each internal connection is labeled according to its status (e.g., active or inactive) and/or condition (e.g., network compliancy). Whenever a new device is added to or an old device is removed from the network, a network reset is initiated. The devices communicate by sending messages over the home network using a generic message passing system. When new devices join the home network, they are recognized and added to a global name database (registry). The registry holds information about their characteristics and provides a reference to a handler for that device. Other devices and services are able to query the registry to locate a device and then using the handler, can interact with the device.

U.S. Pat. No. 6,233,611 to Ludtke, et al. issued May 15, 2001 and entitled "Media manager for controlling autonomous media devices within a network environment and managing the flow and format of data between the devices" discloses a media manager providing data flow management and other services for client applications on devices coupled together within a network, such as via an IEEE 1394-1995 serial bus network. A device control module is generated for each available device for providing an abstraction for all of the capabilities and requirements of the device including the appropriate control protocol, physical connections and connection capabilities for the device. The module also provides network enumeration and registry searching capabilities for client applications to find available services, physical devices and virtual devices. The service registry includes a reference to all addressable entities within the media manager, including a reference for each device control module (DCM), DCM Manager, data flow manager, transaction manager, data format manager, bus manager, and graphics manager. The service registry also contains a number of service modules, and a service registry database including references for all of the objects that are local to its node and at specific times references to remote objects as well.

U.S. Pat. No. 6,337,717 to Nason, et al. issued Jan. 8, 2002 and entitled "Alternate display content controller" discloses a technique for controlling a video display separately from and in addition to the content displayed on the operating system monitor. Where the display is a computer monitor, the alternate display content controller interacts with the computer utility operating system and hardware drivers (including a registry) to control allocation of display space and create and control one or more parallel graphical user interfaces adjacent the operating system desktop. An alternate display content controller may be incorporated in either hardware or software. As software, an alternate display content controller may be an application running on the computer operating system, or may include an operating system kernel of varying complexity. The alternate display content controller may also include content and operating software delivered over the Internet or any other LAN, and may also be included in a television decoder/settop box to permit two or more parallel graphical user interfaces to be displayed simultaneously. See also U.S. Pat. No. 6,630,943 to Nason, et al. issued Oct. 7, 2003 and entitled "Method and system for controlling a complementary user interface on a display surface", and U.S. Pat. No. 6,330,010 to Nason, et al. issued Dec. 11, 2001 and entitled "Secondary user interface".

U.S. Pat. No. 6,529,965 to Thomsen, et al. issued Mar. 4, 2003 and entitled "Method of detecting TCP/IP bindings of installed network interface cards present in a computer system" discloses a method for detecting TCP/IP bindings for Network Interface Cards (NICs) installed on Windows® operating systems with a VPN (Virtual Private Network) client present. The method parses the Windows system registry to detect TCP/IP bindings for network interface cards installed within a host computer system. In one embodiment, a DriverCheck function and a HardwareCheck function are implemented as parts of software for detecting the TCP/IP bindings for network interface cards installed on the host computer system.

U.S. Pat. No. 6,600,958 to Zondag issued Jul. 29, 2003 and entitled "Management of functionality in a consumer electronics system" discloses a communication system with a plurality of controlled stations. The functionality of each controlled station is associated with a respective abstract representation, referred to as AR. The AR provides an interface for software elements in the system to control functionality of the controlled station by means of messages exchanged with the AR via the communication network. The AR may be implemented using platform-independent code, such as Java. A registry which serves as a directory service and allows any object to locate another object on the home network is also disclosed. The disclosed functional control modules (FCMs) and other similar component entities describe devices with different levels of functionality, and the ability to manage and control other devices. Entries in the aforementioned registry relate to entire devices, each with multiple hardware resources, as opposed to individual hardware resources. The IEEE-1394 registry indicates the type of network messaging protocol that can be used to communicate various units on the network.

U.S. Pat. No. 6,625,274 to Hoffpauir, et al. issued Sep. 23, 2003 and entitled "Computer system and method for providing services to users of communication systems using service entities, interface entities, and a service bus" discloses a system for providing services and includes service entities, interface entities, and a service bus. Each service entity produces and receives events and includes at least one of a reusable macro function, an application programming interface (API) function, and a management interface function. Each service is implemented with at least one service entity. Each interface entity produces and receives events and is coupled to a communication system and communicates with the communication system using a communication protocol. The service bus couples the interface entities and the service entities and passes events between the interface entities and service entities. A software-implemented service registry is also provided which tracks the services offered by the service provider and the service entities for each different service. The service entities are implemented using functions accessed from the software-implemented library.

U.S. Patent Application Publication No. 20030121055 to Kaminski, et al. published Jun. 26, 2003 and entitled "Program position user interface for personal video recording time shift buffer" discloses a system providing information about media content stored in a storage device coupled to an interactive media services client device. A window manager is disclosed which, inter alia, maintains a user input registry in DRAM so that when a user enters a key or a command via a remote control device (or another input device such as a keyboard or mouse), the user input registry is accessed to determine which of various applications running should receive data corresponding to the input key and in which order. See also related U.S. Patent Application Publication Nos. 20030110511 to Schutte, et al. published Jun. 12, 2003 and entitled "Controlling personal video recording functions from interactive television", U.S. Patent Application Publication No. 20030005454 to Rodriguez, et al. published Jan. 2, 2003 and entitled "System and method for archiving multiple downloaded recordable media content", and U.S. Patent Application Publication No. 20030163811 to Luehrs published Aug. 28, 2003 and entitled "Positive parental control".

The recently proposed Home Audio Video Interoperability (HAVi) specification is a consumer electronics (CE) industry standard design to permit digital audio and video devices that conform to this standard, regardless of manufacturer, to interoperate when connected via a network in the consumer's home. The HAVi standard uses the digital IEEE-1394 network standard for data transfer between devices and the 1394 A/VC protocols for device control.

The HAVi standard focuses on the transfer and processing (for example, recording and playback) of digital content between networked devices. HAVi-compliant devices will include not only familiar audio and video components but also cable modems, digital set-top boxes and "smart" storage devices such as personal video recorders (PVRs). Compliance with the HAVi standard also allows disparate brand devices to be hooked into a home network.

By employing modular software, the HAVi standard allows consumer electronics devices to identify themselves and what they can do when plugged into the host. The software functions by assigning a device control ID module to each hardware component of a system. Each system also is assigned multiple functional component modules, containing information about an individual device's capabilities, for example, whether a camcorder operates in DV format, or whether a receiver is designed to process AC3 audio.

HAVi-compliant devices automatically register their operating status, device functions and location with other components in the network. So when a host device recognizes a new component on a HAVi system, the host loads the appropriate device and functional modules, allowing users to control the target device from the host.

The HAVi Registry is a system service whose purpose is to manage a directory of software elements available within the home network. It provides an API to register and search for software elements. Within one device any local software elements can describe themselves through the Registry. If a software element wants to be contacted, it must register with the Registry. System software elements are registered so that they can be found and contacted by any software element in the network.

The Registry maintains, for each registered object, its identifier (SEID) and its attributes.

The Registry also provides a query interface which software elements can use to search for a target software element according to a set of criteria.

Each Registry contains tables describing local software elements (software elements within the same device). The logical database is viewed as the set of all these tables. Each Registry service offers the possibility to query this database.

Applications can query the Registry to find the devices and functional components available, and to obtain their software element identifiers. This allows the application to interact with the device via the device control module (DCM) and the functional component modules (FCMs). A DCM and its FCMs are obtained from a DCM code unit for the device.

DCM code units are installed by FAVs and IAVs. Installation of a code unit results in the installation of the DCM and all the associated FCMs. DCM code units can be written in Java bytecode, in which case they can be installed on any FAV device, or in some native code, in which case they can be installed only on (and by) some FAV or IAV that can execute that code.

Each object is uniquely named. No distinction is made between objects used to build system services and those used for application services. Objects make themselves known via a system wide naming service known as the Registry.

Objects in the system can query the Registry to find other objects and can use the result of that query to send messages to those objects.

The identifier assigned to an object is created by the Messaging System before an object registers. These identifiers are referred to as SEIDs—Software Element Identifiers. SEIDs are guaranteed to be unique, however the SEID assigned to an object may change as a result of reconfiguration of the home network (for example, device plug-in or removal, or re-initialization of a HAVi device).

Despite the foregoing, no suitable methodology or architecture for allowing an application running on CPE to discover and control the hardware options present on the CPE has been disclosed under the prior art. Accordingly, there is a need for improved apparatus and methods for the autonomous discovery and control of hardware options and features within these devices by such applications. These improved apparatus and methods would ideally meet these needs in a "universal" fashion; i.e., across heterogeneous hardware environments (whether retail or leased), while also providing compliance with industry standard requirements within the network.

SUMMARY OF THE INVENTION

The present invention addresses the foregoing needs by disclosing improved methods and apparatus for accessing and controlling one or more hardware options on CPE.

In a first aspect of the invention, an improved method of operating client equipment on a content-based network is disclosed. The method generally comprises: providing at least one software interface adapted to interface with a hardware option; starting at least one application; discovering the option and interface using the application; and selectively controlling the option using the application and the software interface. In one exemplary embodiment, the client equipment comprises a set-top box used in an HFC cable network, and the software interfaces comprise APIs adapted to interface with hardware options and a Java-based application, the latter downloaded to the client device via the network. Calls are made by the application to the device middleware in order to discover and control the hardware, which may comprise e.g., DVR/PVR/DVI functionality.

In a second aspect of the invention, improved consumer premises equipment (CPE) having application-controlled functionality is disclosed. The CPE generally comprises: a plurality of hardware features; a software application; middleware adapted to communicate with the software application and the hardware features via a plurality of software interfaces; and a hardware registry having a plurality of entries associated therewith and relating to respective ones of the hardware options. In one exemplary embodiment, the CPE is a Java-based system which is configured to run the application; discover the registry, entries and software interfaces using software calls; and access and control the hardware features via at least one of interfaces.

In another embodiment the CPE includes a monitor application running thereon adapted to (i) detect at least one event relating to the operation of one or more software applications running on the CPE; (ii) selectively log data relating to the event(s) for subsequent use; and (iii) control the operation of the CPE based at least in part on the detected event(s).

In a third aspect of the invention, a method of operating a cable network having a plurality of client devices operatively coupled thereto is disclosed, the method generally comprising: distributing at least one software application to each of the plurality of devices; providing a hardware registry within each of the devices, the hardware registry containing data relating to a plurality of hardware features of the devices; providing at least one software interface within each of the devices, the software interfaces being configured to interface between the application and the hardware; features running the software application to discover the registry and software interface(s), and controlling at least one hardware feature using the application and interface(s). In one exemplary embodiment, the network comprises an HFC cable network, and the application comprises a DVR-enabled application adapted to selectively process (e.g., store) content distributed over the network.

In a fourth aspect of the invention, an improved head-end apparatus for use in a cable network is disclosed, generally comprising at least one server having a software process running thereon and adapted to selectively download an application to client devices. The application is configured to detect and access records within a hardware registry disposed on the client devices, and control at least one hardware feature of the device via one or more software interfaces within the middleware thereof.

In a fifth aspect of the invention, an improved application for use in a cable network is disclosed. The improved application generally comprises a computer program adapted to run on a client device and to: (i) detect and access records within a hardware registry disposed on the client device; and (ii) control at least one hardware feature associated with the device via one or more software interfaces associated with the middleware thereof. In one exemplary embodiment, the application comprises an object-oriented (e.g., Java) rendering adapted to make various function calls to the middleware of the client device to discover the registry and access the various hardware options via a plurality of APIs resident within the middleware.

In a sixth aspect of the invention, an improved cable network is disclosed, generally comprising: a plurality of client devices each having at least one controllable hardware feature; a plurality of registries each retaining information relating to the controllable feature(s); middleware running on respective ones of the client devices adapted to interface with an application and the controllable feature(s); and a head-end apparatus comprising at least one server having a software process running thereon, the software process being adapted to selectively download the application to the client devices. In one exemplary embodiment, the network comprises an HFC cable network.

In a seventh aspect of the invention, an improved method of conducting business via a cable network is disclosed. The method generally comprises: distributing at least one software application to the devices; running the software application on at least one of the devices; discovering the hardware registry and software interfaces associated with the device(s) using the application, and controlling at least one of the hardware features using the application.

In an eighth aspect of the invention, improved CPE for use in a content-based network is disclosed, the CPE generally having an application-accessible hardware registry database comprising a plurality of records, each of the records having plurality of fields relating to one or more of a plurality of hardware options. In an exemplary embodiment, the fields comprise: (i) at least one field to identify the type or class of hardware; (ii) at least one field having parameters that are specific to the hardware; and (iii) at least one field having a reference to software interface (e.g., API) that can be used to access and manipulate the hardware. The fields may also be adapted to uniquely differentiate hardware of the same type. Java search strings are used by applications to discover the various hardware options and APIs automatically.

These and other aspects of the invention shall become apparent when considered in light of the disclosure provided below.

DETAILED DESCRIPTION OF THE INVENTION

Figure 1:
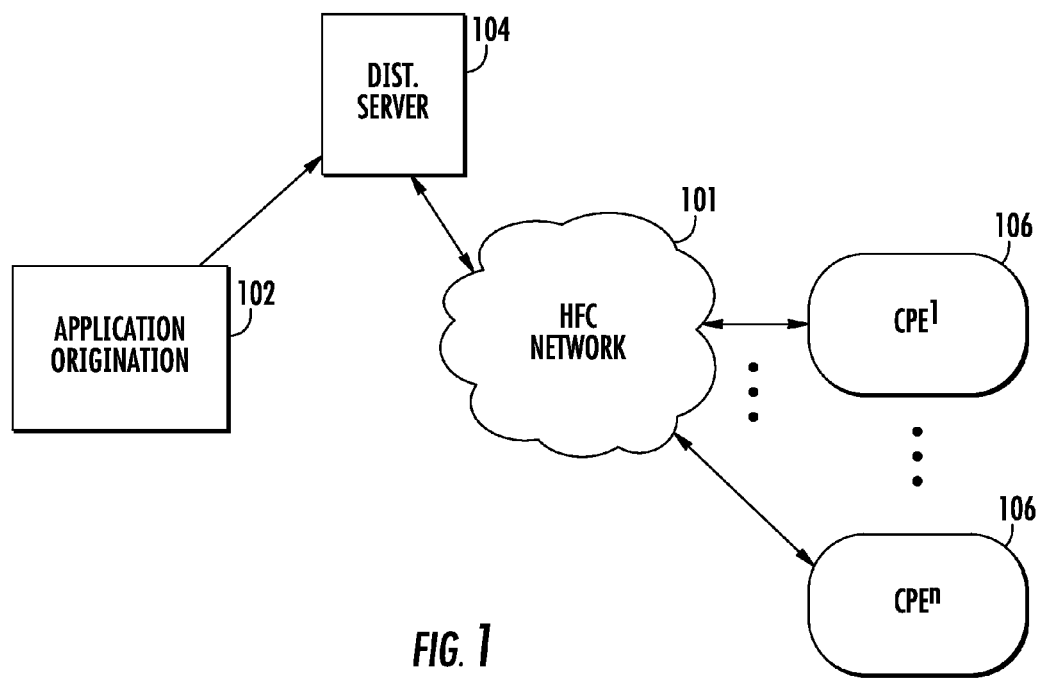
FIG. 1 is a functional block diagram illustrating an exemplary HFC network configuration useful with the present invention.

Reference is now made to the drawings wherein like numerals refer to like parts throughout.

As used herein, the term "application" refers generally to a unit of executable software that implements theme-based functionality The themes of applications vary broadly across any number of disciplines and functions (such as e-commerce transactions, brokerage transactions, mortgage interest calculation, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "computer program" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "middleware" refers to software that generally runs primarily at an intermediate layer in a software or protocol stack. For example, middleware may run on top of an operating system and platform hardware, and below applications.

The term "component" refers generally to a unit or portion of executable software that is based on a related set of functionalities. For example, a component could be a single class in Java™ or C++. Similarly, the term "module" refers generally to a loosely coupled yet functionally related set of components.

As used herein, the term "process" refers to executable software that runs within its own CPU environment. This means that the process is scheduled to run based on a time schedule or system event. It will have its own Process Control Block (PCB) that describes it. The PCB will include items such as the call stack location, code location, scheduling priority, etc. The terms "task" and "process" are typically interchangeable with regard to computer programs.

A server process is an executable software process that serves various resources and information to other processes (clients) that request them. The server may send resources to a client unsolicited if the client has previously registered for them, or as the application author dictates.

As used herein, the term "singleton" refers generally to the existence of only one instance of an object. In the Java context, it involves definition of a class that can only be created once. The definition of the class will not allow public access of any constructor in a class and instead provides a getInstance method or separate factory class with a get method for the singleton object. Calling either of these returns the singleton object.

As used herein, the term "DTV Network Provider" refers to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "head-end" refers generally to a networked system controlled by an operator (e.g., an MSO or multiple systems operator) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional head-ends may be in the same or different cities.

As used herein, the terms "client device" and "end user device" include, but are not limited to, personal computers (PCs) and minicomputers, whether desktop, laptop, or otherwise, set-top boxes such as the Motorola DCT2XXX/5XXX and Scientific Atlanta Explorer 2XXX/3XXX/4XXX/8XXX series digital devices, personal digital assistants (PDAs) such as the Apple Newton®, "Palm®" family of devices, handheld computers such as the Hitachi "VisionPlate", personal communicators such as the Motorola Accompli devices, Motorola EVR-8401, J2ME equipped devices, cellular telephones, or literally any other device capable of interchanging data with a network.

Similarly, the terms "Consumer Premises Equipment (CPE)" and "host device" refer to any type of electronic equipment located within a consumer's or user's premises and connected to a network. The term "host device" refers generally to a terminal device that has access to digital television content via a satellite, cable, or terrestrial network. The host device functionality may be integrated into a digital television (DTV) set. The term "consumer premises equipment" (CPE) includes such electronic equipment such as set-top boxes, televisions, Digital Video Recorders (DVR), gateway storage devices (Furnace), and ITV Personal Computers.

As used herein, the term "network agent" refers to any network entity (whether software, firmware, and/or hardware based) adapted to perform one or more specific purposes. For example, a network agent may comprise a computer program running in server belonging to a network operator, which is in communication with one or more processes on a CPE or other device.

As used herein, the term "DOCSIS" refers to any of the existing or planned variants of the Data Over Cable Services Interface Specification, including for example DOCSIS versions 1.0, 1.1 and 2.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1. 1, yet provides a wider upstream band (6.4 MHz), as well as new modulation formats including TDMA and CDMA. It also provides symmetric services (30 Mbps upstream).

The term "processor" is meant to include any integrated circuit or other electronic device (or collection of devices) capable of performing an operation on at least one instruction including, without limitation, reduced instruction set core (RISC) processors, CISC microprocessors, microcontroller units (MCUs), CISC-based central processing units (CPUs), and digital signal processors (DSPs). The hardware of such devices may be integrated onto a single substrate (e.g., silicon "die"), or distributed among two or more substrates. Furthermore, various functional aspects of the processor may be implemented solely as software or firmware associated with the processor.

As used herein, the term "DVR" (digital video recorder) refers generally to any type or recording mechanism and/or software environment whereby content sent over a network can be recorded and selectively recalled. Such DVR may be dedicated in nature, or part of a non-dedicated or multi-function system.

As used herein, the term "DVI" (digital video interface) refers generally to any type of interface (e.g., hardware and/or software) adapted to provide interface and/or conversion between different formats or domains, including without limitation interfaces compliant with the Digital Display Working Group (DDWG) DVI specification (e.g., DVI-A, DVI-D, and DVI-I). For example, using a DVI connector and port, a digital signal sent to an analog monitor is converted into an analog signal; if the monitor is digital, such as a flat panel display, no conversion is necessary. A DVI output is an option in OpenCable compliant hardware that provides a high-definition TV (HDTV) output which includes copy protection. Copy protection constrains the ability to copy program events. Methods and apparatus for providing such copy protection are well known in the digital television arts, and accordingly not discussed further herein.

Overview

The present invention provides improved apparatus and methods for control of hardware within a networked electronic device through use of a hardware registry. Such electronic equipment that may contain optional hardware; the present invention provides for the description, access, and manipulation of such hardware by a downloaded application using a hardware registry. The registry contains records which correspond to an optional set of hardware functionality (e.g., personal video recorder). Each record (or set of records) may contains fields that: (i) identify the type of circuitry and peripherals, (ii) uniquely identifies circuitry and peripherals of the same type, (iii) specify parameters that are specific to the circuitry and peripherals types, and/or (iv) contain a reference to an application programming interface that can be used to access and manipulate the circuitry and peripherals. In the exemplary configuration, the electronic device comprises an OCAP-compliant consumer premises device (e.g., embedded set-top box, etc.) adapted to provide control over Host CORE optional circuitry for a digital video recorder (DVR) and digital video interface (DVI).

The invention therefore advantageously enables a DVR or DVI application to be downloaded to retail or leased set-top boxes and other consumer electronics equipment, and to control any available DVR or DVI circuitry found therein or functions associated therewith. This not only permits "after-the-fact" control of optional hardware features in a retail (third party) electronics device by the MSO or other system operator, but also allows for control and reconfiguration of leased devices after distribution to the end user(s). This technology provides for significant business opportunities as well, such as agreements between MSOs and retail manufacturers whereby certain optional features resident within the consumer device may be selectively accessed via the registry. For example; MSO applications can take advantage of consumer electronics manufacturer-provided hardware that is standardized in OCAP. With an agreement between a manufacturer and an MSO, non-standardized hardware options can be placed in the hardware registry in standardized fashion, and accordingly MSO applications can take advantage of this proprietary hardware as well.

Detailed Description of Exemplary Embodiments

Exemplary embodiments of the apparatus and methods of the present invention are now described in detail. While these exemplary embodiments are described in the context of the aforementioned hybrid fiber coax (HFC) cable system architecture having an multiple systems operator (MSO), digital networking capability, and plurality of client devices/CPE, the general principles and advantages of the invention may be extended to other types of networks and architectures, whether broadband, narrowband, wired or wireless, or otherwise, the following therefore being merely exemplary in nature.

It will also be appreciated that while described generally in the context of a consumer (i.e., home) end user domain, the present invention may be readily adapted to other types of environments (e.g., commercial/enterprise, government/military, etc.) as well. Myriad other applications are possible.

FIG. 1 illustrates a typical network component configuration with which the hardware registry apparatus and methods of the present invention may be used. The various components of the network 100 include (i) one or more application origination points 102; (ii) one or more distribution servers 104; and (iii) consumer premises equipment (CPE) 106. The distribution server(s) 104 and CPE(s) 106 are connected via a bearer (e.g., HFC) network 101. A simple architecture comprising one of each of the aforementioned components 102, 104, 106 is shown in FIG. 1 for simplicity, although it will be recognized that comparable architectures with multiple origination points, distribution servers, and/or CPE devices (as well as different network topologies) may be utilized consistent with the invention. For example, the head-end architecture of FIG. 1a (described in greater detail below) may be used.

The application origination point 102 comprises any medium that allows an application to be transferred to a distribution server 104. This can include for example an application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The distribution server 104 comprises a computer system where one or more applications can enter the network system. Distribution servers are well known in the networking arts, and accordingly not described further herein.

The applications delivered to the head-end and ultimately delivered to the CPE 106 for use with the hardware registry of the present invention can comprise any number of different types.

The CPE 106 includes any equipment in the "consumers' premises" (or other locations, whether local or remote to the distribution server 104) that can be accessed by a distribution server 104. Such CPEs 106 comprise processors and associated computer memory adapted to store and run the downloaded or resident application. In the present context, at least a portion of the application is typically downloaded to the CPE 106, wherein the latter executes the downloaded application(s)/components Applications may be (i) "pushed" to the CPE (i.e., wherein the distribution server causes the application download to occur), (ii) "pulled" to the CPE (i.e., where the CPE causes the download), (iii) downloaded as the result of some third entity or device (such as a remote server); (iv) resident on the CPE at startup; or (v) combinations of the foregoing.

Figure 1A:
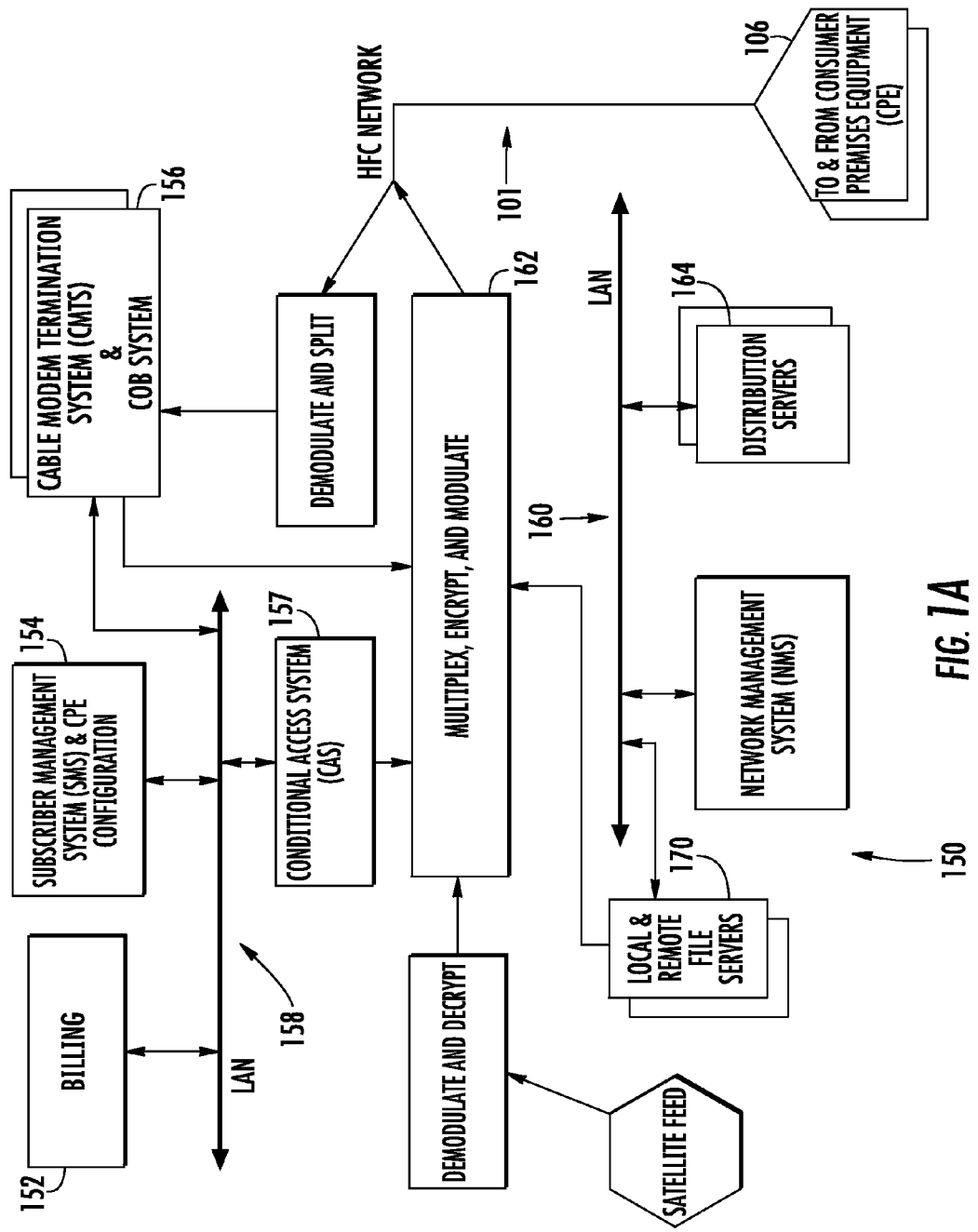
FIG. 1a is a functional block diagram illustrating one exemplary head-end configuration of an HFC network useful with the present invention.

Referring now to FIG. 1a, one exemplary embodiment of the network head-end architecture useful with the invention is described. As shown in FIG. 1a, the head-end architecture 150 comprises typical head-end components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the head-end configuration depicted in FIG. 1a is high-level, conceptual architecture and that each MSO may have multiple head-ends deployed using custom architectures.

The architecture 150 of FIG. 1a further includes a multiplexer/encrypter/modulator (MEM) 162 coupled to the HFC network 101 adapted to "condition" content for transmission over the network. In the present context, the distribution servers 104 are coupled to the LAN 160, which provides access to the MEM 162 and network 101 via one or more file servers 170. In the typical HFC network, information is carried across multiple channels. Thus, the head-end must be adapted to acquire the information for the carried channels from various sources. Typically, the channels being delivered from the head-end 150 to the CPE 106 ("downstream") are multiplexed together in the head-end and sent to neighborhood hubs (not shown).

Content (e.g., audio, video, etc.) is provided in each downstream (in-band) channel. To communicate with the head-end, the CPE 106 uses the out-of-band (OOB) or DOCSIS channels and associated protocols. The OCAP 1.0 specification provides for networking protocols both downstream and upstream. To distribute files and applications to the CPE 106, the files and applications are configured as data and object carousels and may be sent in both the in-band and OOB channels. As is well known in the art, a carousel may be viewed as a directory containing files. The files of the carousel utilized herein are sent in a continuous round-robin fashion. If the client device misses a desired or necessary file in one carousel transmission, it can wait for the next. Alternatively, in another embodiment, the CPE portion of the application is configured as part of the program content on a given in-band or DOCSIS channel. As yet another embodiment, the CPE portion is downloaded directly using IP (Internet Protocol) packet traffic in an Out-Of-Band channel. Note that the file carousel or other device providing the application to the CPE 106 via the aforementioned communication channels may be the distribution server 104 previously described, or alternatively a separate device which may or may not be physically co-located with the server (e.g., remote file servers 170 of FIG. 1a). For example, a remote file storage device (not shown) with carousel capability may be in data communication with the client device(s) via an out-of-band communications channel as described below, the download of the client portion files from the remote device being initiated by way of a query from the client device, or alternatively a signal generated by the server 104 and transmitted to the remote device. Many other permutations of the foregoing system components and communication methods may also be used consistent with the present invention, as will be recognized by those of ordinary skill in the field.

Figure 2:
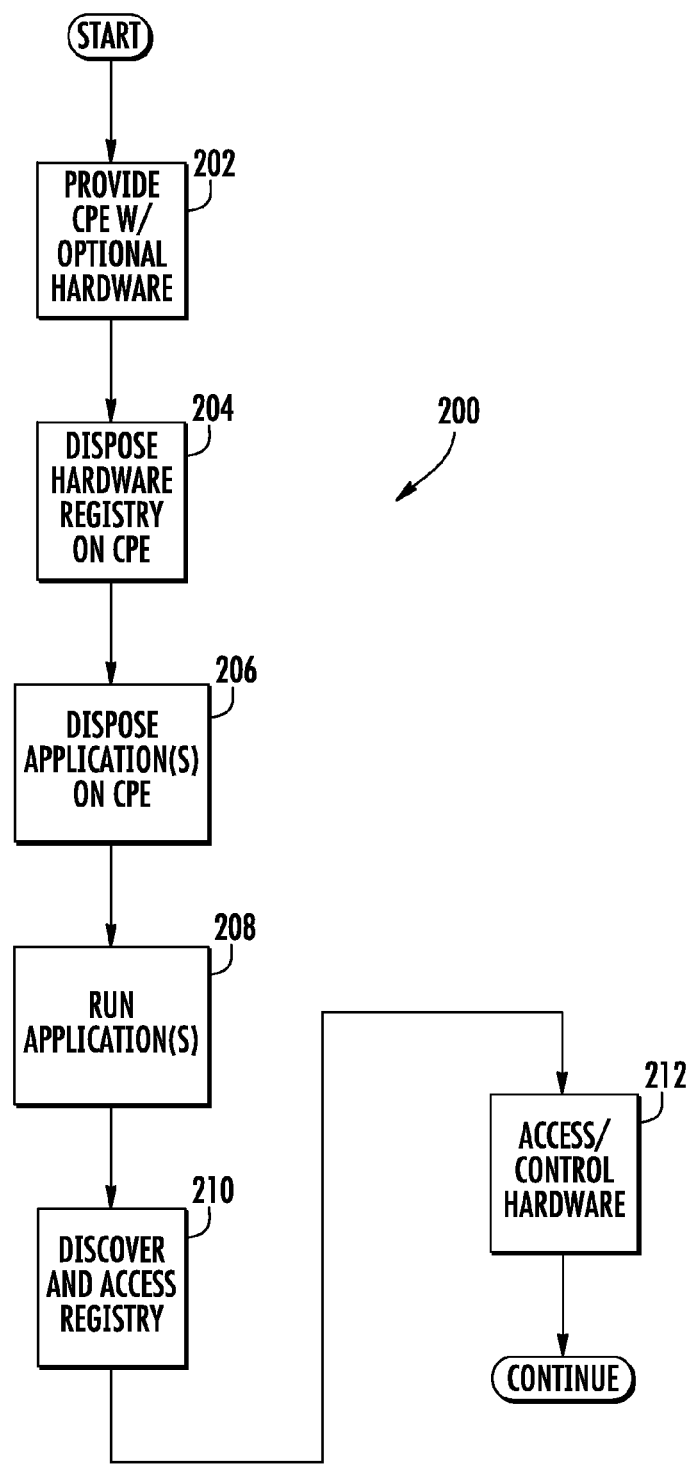
FIG. 2 is a logical flow diagram illustrating one exemplary embodiment of the hardware registry methodology according to the invention.
Figure 2A:
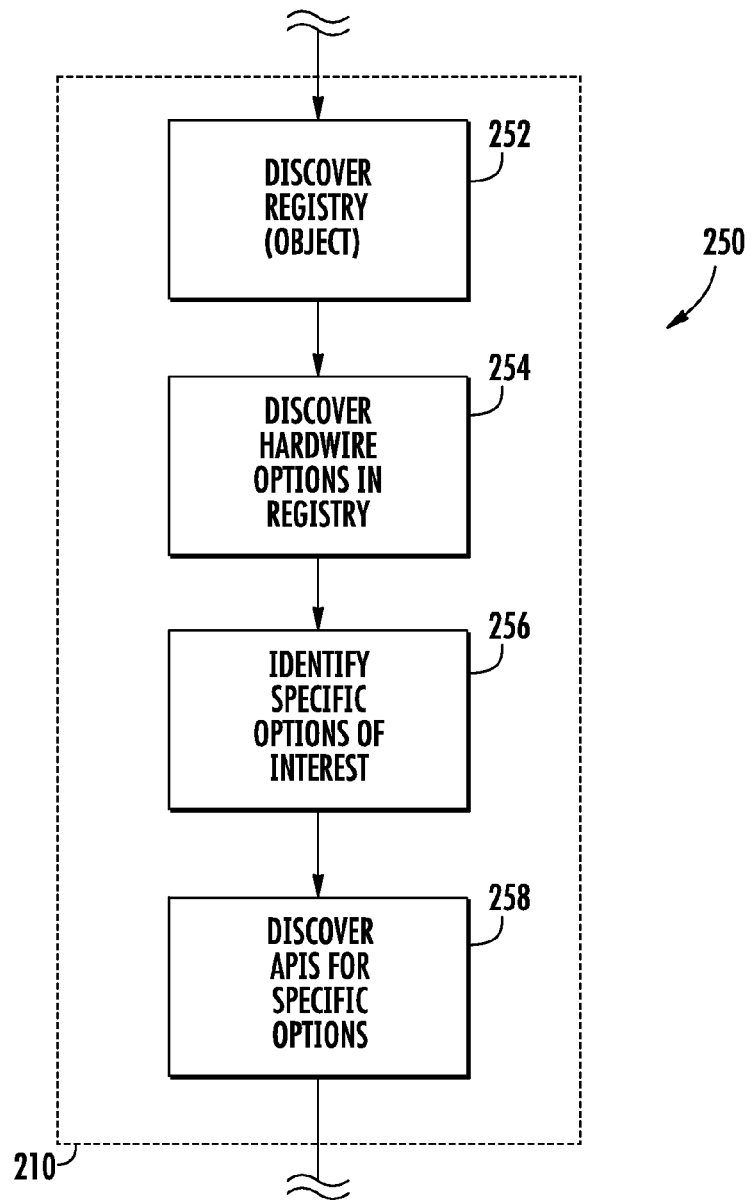
FIG. 2a is a logical flow diagram illustrating an exemplary method of accessing the hardware registry as part of the method of FIG. 2.

Referring now to FIGS. 2-2a, the methodology of operating an electronic device according to the invention is described in the context of an OpenCable-compliant hardware and software environment. The OpenCable™ standard sets forth a Host CORE Functional Requirements specification which defines optional circuitry for digital video recorder (DVR), and digital video interface (DVI); see, e.g., the OpenCable™ Host Device Core Functional Requirements OC-SP-HOST-CFR-113-030707 (now OC-SP-HOST-CFR-114-030905 dated Sep. 5, 2003) specification. As previously discussed, the hardware registry apparatus and methods of the present embodiment enables a DVR/DVI application to be downloaded to retail set-top boxes and other OpenCable compliant consumer electronics equipment and control any available DVR/DVI circuitry found therein. It will be recognized, however, that the OpenCable environment is merely illustrative of the broader principles of the invention, the latter being in no way so limited.

As shown in FIG. 2, the method 200 generally comprises first providing an electronic device (e.g., CPE 106) having optional hardware associated therewith (step 202). The CPE 106 typically comprises an embedded electronic device such as a DSTB that may contain one or more optional hardware features. As used herein, the terms "optional hardware" and "hardware options" generally defined as circuitry and peripherals (including any associated or supporting firmware and software) that are common to specific hardware functionality, but are not required within that class of consumer electronic embedded devices (e.g., set-top boxes, and TVs), such as for example DVR or DVI functionality in a digital set-top box.

Next, per step 204, a hardware registry entity is disposed within the CPE 106 (or associated equipment) to provide the desired control over the optional hardware functions of the CPE 106. This entity may comprise, for example, additional hardware, firmware, and/or software adapted to maintain the registry data (including the APIs necessary for interface with other entities on- or off-board of the CPE 106). In one exemplary configuration, the hardware registry comprises a singleton made part of the embedded device (CPE) middleware.

As will be described in greater detail subsequently herein, the optional hardware of the CPE 106 can be discovered, accessed, and manipulated if desired by a downloaded application or other software entity using this hardware registry. The registry contains one or more records wherein each record (or alternatively, associated set of records) corresponds to an optional hardware functionality (e.g., personal video recorder or PVR). The hardware registry may be disposed on the CPE 106 at time of manufacture, installed before distribution of leased equipment by the network operator, downloaded or otherwise installed on the CPE after installation of the latter in the consumer's premises, or any combinations of the foregoing (such as where the necessary hardware/firmware is installed on the device at retail manufacture or lease, and then "enabled" through a selective download and installation of software to the CPE). As will be readily recognized by those of ordinary skill, myriad different distribution procedures and paradigms may be used with the invention described herein.

Per step 206, an application or other software entity is then introduced onto the CPE 106 via, e.g., direct download over the bearer network, download via another network/network agent or OOB channel, or even distribution via "hard" media such as CD-ROM or DVD. This application may comprise any number of different interactive or non-interactive themes; e.g., content viewing, IPG, gaming, home shopping, Internet browsing, etc., although the exemplary embodiment discussed herein comprises an entertainment-based application suitable for use with PVR (DVR) type functionality, wherein the user can selectively stop, rewind, slow motion, etc. the content delivered to the CPE 106.

It will be recognized that the downloaded application may further comprise, without limitation, a (i) pre-existing application which is merely distributed to a plurality of CPE without discrimination as to their type or capabilities; (ii) pre-existing application which is selectively distributed to subsets of the CPE based at least in part on the latter's type or capabilities, and/or subscription terms (e.g., only to customers with Scientific Atlanta Explorer Model 8000 Series DSTBs who have signed up for DVR/PVR capability); (iii) pre-existing application which is selectively configured at time of download for a particular CPE or class of CPE (e.g., a modular application which is pre-configured for a particular type of CPE based on information such as CPE profile data from a connected profile database); or (iv) modular application effect built from the ground up at the time of download to the CPE, and optionally tailored to that particular CPE (or class of CPE or user). In this fashion, the MSO or third party content provider is given the opportunity to deliver applications that will both maximize the functionality available to the user (thereby enhancing the user's experience) and provide the desired level of control to the MSO/provider.

As will be recognized by those of ordinary skill, the foregoing configuration of downloaded applications may be conducted using any number of well known software selection and configuration techniques which accordingly are not described further herein.

The downloaded application is then run (step 208) on the CPE, at which point the application accesses the hardware registry (such as via the APIs associated with the registry and device middleware) per step 210 to determine all available optional features and/or information relating to specific features of interest or utility to that application (e.g., the aforementioned PVR/DVR/DVI).

FIG. 2a illustrates one exemplary method 250 of accessing the hardware registry (step 210) according to the invention. This approach uses a technique generally referred to as "remote invocation". As described in greater detail below, this method comprises first discovering the hardware registry object (step 252). Subsequently, the hardware registry (object) is queried using, e.g., a search string to discover one or more instances of hardware options resident in the registry (step 254).

Next, per step 256, one or more specific hardware options within the registry are identified. For example, the hardware registry may contain entries for multiple different PVRs, only one of which is desired or required by the discovering application.

Lastly, the APIs (or other interface mechanisms) associated with the desired hardware option(s) are discovered by the application (step 258), enabling access and control of the option(s) thereby.

Once an application has discovered the hardware option(s) that are of relevance, it can access and manipulate the hardware (and any associated firmware and/or software) as required using the hardware option(s) API (step 212).

Figure 3:
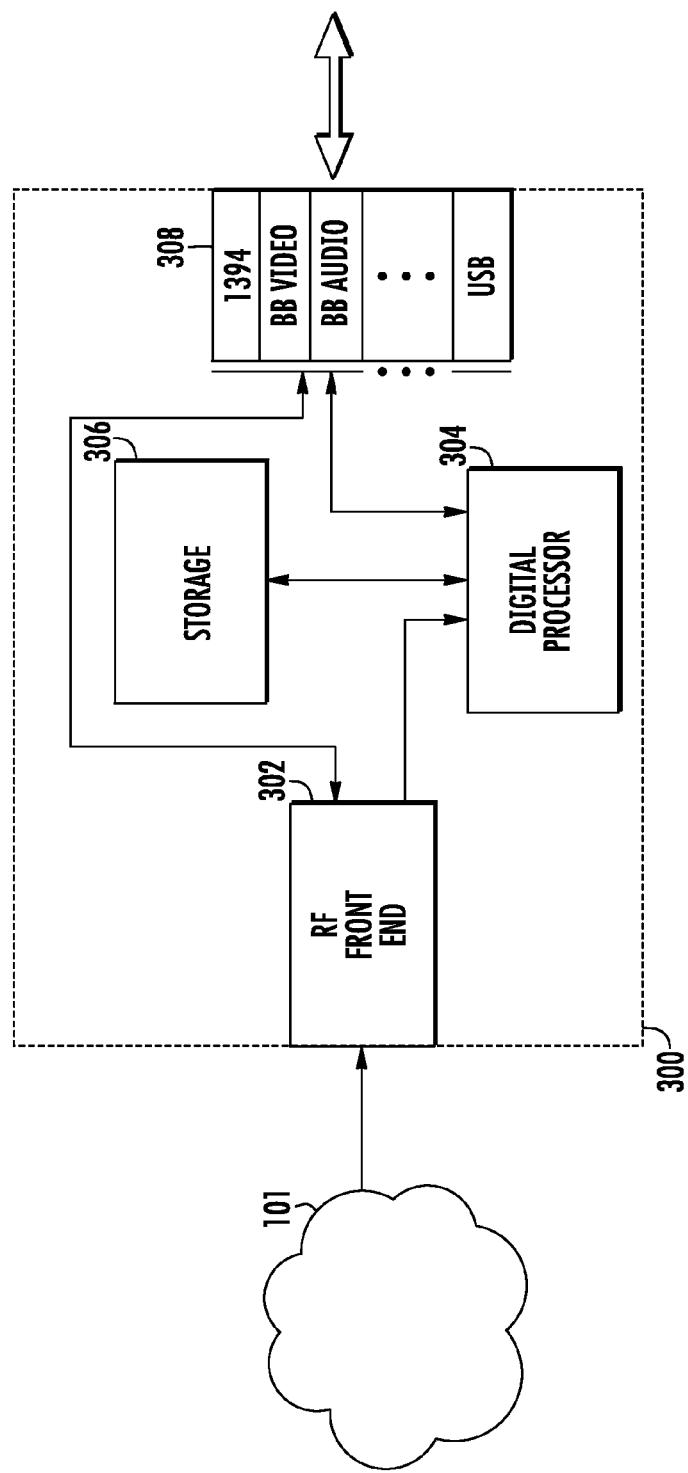
FIG. 3 is a functional block diagram of exemplary CPE having a hardware registry and optional hardware features, according to the invention.

FIG. 3 illustrates a first embodiment of the improved electronic device with hardware registry according to the present invention, shown in simplified form. The device 300 generally comprises and OpenCable-compliant embedded system having an RF front end 302 (including modulator/demodulator) for interface with the HFC network 101 of FIG. 1, digital processor(s) 304, storage device 306, and a plurality of interfaces 308 (e.g., video/audio interfaces, IEEE-1394 "Firewire", USB, serial/parallel ports, etc.) for interface with other end-user apparatus such as televisions, personal electronics, computers, WiFi or other network hubs/routers, etc. Other components which may be utilized within the device (deleted from FIG. 3 for simplicity) include RF tuner and decoder stages, various processing layers (e.g., DOCSIS MAC, OOB channels, MPEG, etc.) as well as media processors and other specialized SoC or ASIC devices. These additional components and functionality are well known to those of ordinary skill in the cable and embedded system fields, and accordingly not described further herein.

The device 300 of FIG. 3 is also provided with an OCAP-compliant monitor application and Java-based middleware which, inter alia, manages the operation of the device and applications running thereon. It will be recognized by those of ordinary skill that myriad different device and software architectures may be used consistent with the hardware registry of the invention, the device of FIG. 3 being merely exemplary.

Figure 3A:
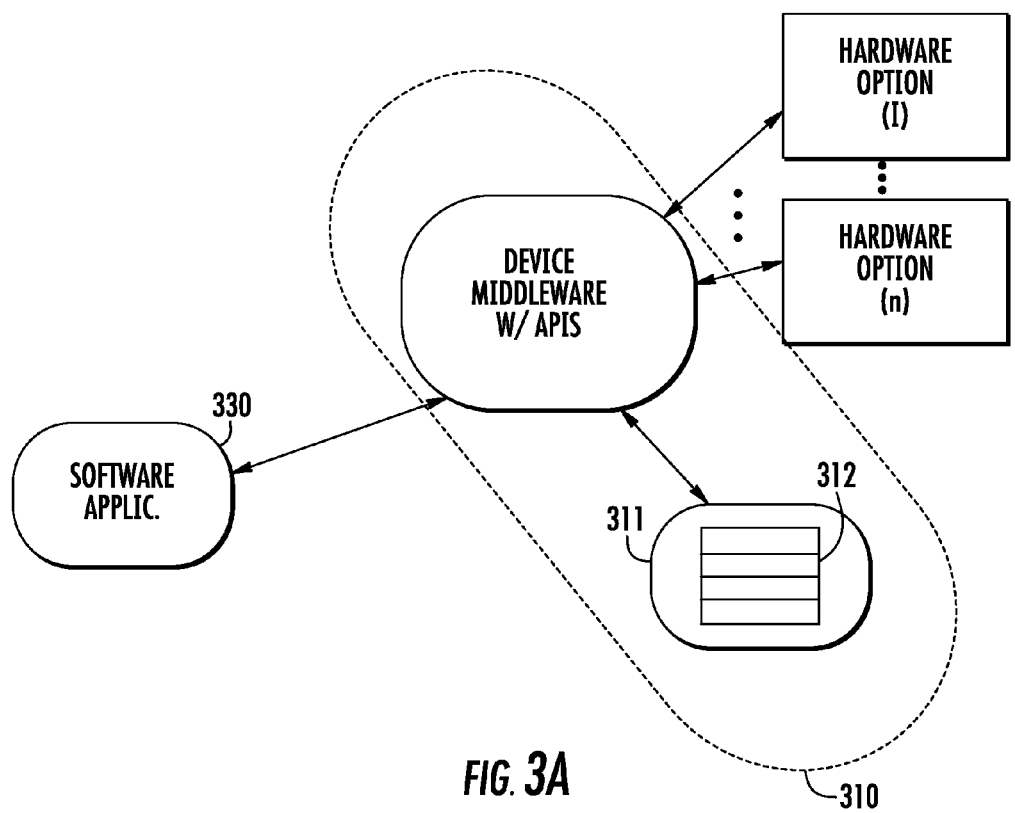
FIG. 3a is a logical block diagram illustrating the relationships between the various entities associated with the hardware registry of the invention.

FIG. 3a illustrates the logical relationships between the various entities associated with the hardware registry 310. In the illustrated embodiment, the registry 310 comprises a software-implemented database 311 maintained by the device 300 that can be accessed by applications 330 downloaded to and running thereon. Storage for this database 311 can be resident on the device 300 (such as in the storage device 306), or alternatively be disposed at another repository such as a networked computer or other electronic device. The storage device for the database 311 may comprise, for example, "flash" PROM memory into which the database records are written, or alternatively a hard drive, memory card, or similar mass storage device. The hardware registry/database may even be provided in the form of a CD-ROM provided to the user as an add-on with their retail purchase of the device 300, or as part of a subscription or "pay-per" arrangement offered by the network operator/service provider.

Once the registry 310 is in place on the device 300 or associated entity, an application belonging to the network provider is downloaded to (or otherwise installed on) the device 300 and launched either under provider or user control. This application comprises, e.g., a Java-based application of the type well known in the software arts; however, as described below, other software programming environments may be utilized consistent with the invention. After launch, the application may access the hardware registry 310 using application programming interfaces (APIs) provided by the device's middleware. In the illustrated embodiment, the device 300 comprises a retail, i.e., third party manufactured, system and hence the registry APIs accessed by the application are advantageously standardized (e.g., to OCAP 1.0 or similar), to provide interoperability of the application across multiple consumer electronic manufacturer's products, although this is not required to practice the invention. For example, non-standardized APIs may be used in the registry for a leased or proprietary system to enable proprietary agreements between network operators and specific CE manufacturers.

Figure 4:
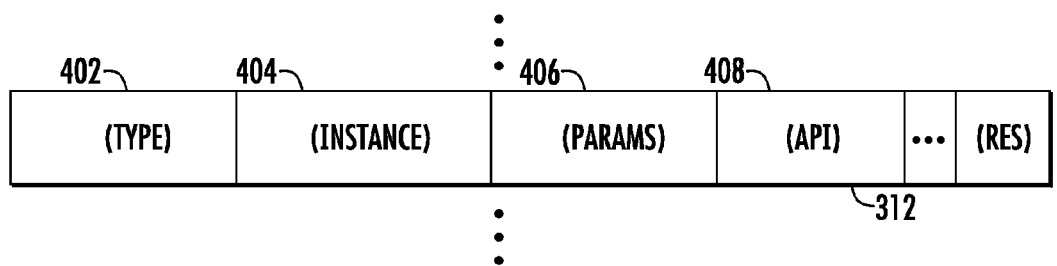
FIG. 4 is a graphical representation of an exemplary configuration of an application record (and associated fields) used in conjunction with the hardware registry database of the invention.

In the exemplary embodiment of the registry database 311, each record 312 contained therein comprises a plurality of different fields (see FIG. 4). These fields include: (i) a field 402 to identify the type or class of circuitry and/or peripherals (e.g., DVR/DVI, mass storage device, I/O port, removable media such as flash disk, removable security such as smartcard, etc.), (ii) a field 404 to uniquely differentiate circuitry and/or peripherals of the same type (e.g., where the CPE 106 has multiple ones of the same or similar optional functions), (iii) a field 406 to specify parameters that are specific to the various circuitry and peripherals types, and (iv) a field 408 contain a reference to an application programming interface (API) that can be used to access and manipulate the circuitry and peripherals. Other fields can optionally be appended onto the record structure 312 of FIG. 4 if desired, and/or other types of structures utilized (e.g., the order of fields within the record permuted, other fields interleaved into the structure, etc.).

Once an application is launched, it can access the hardware registry APIs and request information about one or more of the records 312. For example, in one variant, the discovering application queries all records within the registry. Alternatively, only specific predetermined hardware options are queried. Other variants readily apparent to those of ordinary skill are possible as well.

As an example of the foregoing access and discovery process, a hardware option type such as a personal video recorder (PVR) can be assigned the string "PVR". If the device middleware and the discovering application are written in Java, as with OCAP 1.0 (see examples in Appendix I hereto), the application might first discover the hardware registry object using code similar to the following:

HardwareRegistry hr=HardwareRegistry.getInstance( );
© 2003 Time Warner Cable, Inc. All rights reserved.
where the HardwareRegistry is specified as part of the device middleware, and has a static getInstance method that returns the singleton instance. As is known in the art, the use of the singleton instance allows access to be provided to the instantiated object via a static instance method that creates the object if it has not been created already. This technique is advantageous when providing a system functionality that lends itself to a single point of control. It will be recognized, however, that other techniques may be used consistent with the invention for deriving the singleton HardwareRegistry object reference in Java (such as for example a "factory" of the type well known in Java).

Moreover, the hardware registry 310 may be readily implemented in any number of other computer languages (e.g., C, C++, Ada), whether object-oriented or otherwise, the Java-based embodiments described herein being merely exemplary.

The discovery of the hardware registry 310 described above may be conducted automatically; e.g., by the application at or shortly after startup thereof. Alternatively, the discovery may be made conditional or precedent upon another event, such as for example by an external signal passed in to the middleware from a hardware component.

Once the application has discovered the hardware registry 310, it may access or query one or more of the records associated with a particular hardware option type. For example, the application may lookup optional PVRs in the hardware registry using the following exemplary Java code:

HardwareOption [ ]pvrs=hrfindHardwareOptions ("PVR");
    © 2003 Time Warner Cable, Inc. All rights reserved.

where a HardwareOption is defined as a middleware interface that specifies the method signatures that are common to all hardware options. The findHardwareOptions method is used in the listed example to look up hardware options stored in the hardware registry using the "PVR" string as a lookup key for the hardware option type. After the call, the "pvrs" array from the example will contain any records found using the lookup key. As will be readily recognized by those of ordinary skill, the foregoing approach can be extended to literally any type of option existing within the device 300, and the lookup key or string can be configured in literally any way in order to structure the search as desired.

Once an application has discovered all instances of a specific type of hardware option (i.e., one or more PVRs in the foregoing example), it may iterate through these instances to determine the exact hardware option it will access. Continuing the example provided above, the downloaded application may utilize Java code such as the following:

iterated using a "for" loop as illustrated in the exemplary code provided above. It is noted that each hardware option can be associated with something that differentiates it from other options of the same type. In the example above, the getAssociationName( ) method is implied to be part of the HardwareOption interface definition. In a device such as a set-top box or TV, a PVR or other option can be associated with the primary tuner used for tuning to viewed channels. A secondary tuner could be used for picture-in-picture (PIP) tuning, and have one or more other PVRs associated with it. Hence, the association name can advantageously be specified in many different forms that will be specific to the embedded target device type and also allow for differentiation between particular instances of the same type of option. The association could be a plurality of hardware devices that are associated to a hardware option in the registry.

Once an application has discovered the hardware option(s) of interest, it can access and manipulate the hardware using the hardware option API. In the illustrated embodiment, this API is discovered using another method or function in the HardwareOption interface. The API may be contained by one or more objects if the middleware is implemented using an object-oriented language, e.g., Java, C++, etc. To continue the previous Java-based example (specifically the Java comment in the previous code example stating "perform actions with the desiredPVR"), the hardware option API may be discovered by an application using the following exemplary code:

PvrApi pvrApi=(PvrApi)desiredPVR.getAPI( );
    © 2003 Time Warner Cable, Inc. All rights reserved.

The getAPI method implies another method in the HardwareOption interface. This interface will return a generic object type, so it must be cast to the desired API object reference. The getAPI method definition cannot be created with foreknowledge of all of the types of objects that will be used to represent specific hardware device APIs. Thus, it is necessarily designed to return a generic class or interface that can be cast to the appropriate type at run-time.

Once an application has obtained the API object reference(s) to a hardware option within the registry 310, it can call the hardware option-specific methods within the API to access and manipulate the actual hardware associated with that hardware option. Using the PVR example provided above, an application may store a program event to the storage device 306 (e.g., a hard drive or other mass storage device), and play

```
HardwareOption desiredPvr = null;
if(pvrs != null) {
        if(pvrs.length == 1)
                desiredPvr = pvrs[0];
        else
                for(int i = 0; i < pvrs.length( ); i++) {
                        if(pvrs[i].getAssociationName( ) == "MAIN_TUNER") {
                                desiredPvr = pvrs[i];
                                break;
                        }
                }
        // perform actions with desiredPvr
}
else
        System.out.println("No PVR( )s found.");
                © 2003 Time Warner Cable, Inc. All rights reserved.
```

If the pvrs array is null, then no PVR hardware options were found in the registry. If the length of the pvrs array is one, then there is only one PVR (making it the desired PVR), and it will be in the first location of the array. Otherwise, the array is iterated using a "for" loop as illustrated in the exemplary code it back at a later time, based on inputs provided to the application by the user such as start date and time, etc. It will be recognized that many other activities take place when storing a program event (e.g., entitlement, discovering program start and end time, etc.), the foregoing merely illustrating the manipulation capabilities of the hardware registry at a high level.

Other types of optional hardware may also be controlled, such as hard-drives, removable media (e.g., CD-ROMs, DVDs, memory modules/cards, DAT media, etc.), I/O ports, and other peripherals. The "manipulated" hardware may also comprise components disposed off of the device 300, such as other embedded devices in data communication with the device 300 over wired or wireless links. For example, the CPE device 300 may be HomePlug™ or WiFi enabled, the operation of other networked devices being in some fashion controlled by the application via the hardware APIs. As yet another alternative, content (e.g., video, audio, etc.) can be selectively streamed under application control to a PC, VCR, DVD, PDA, MP3 player, or other client device using, e.g., the USB, serial, or IEEE-1394 port on the device 300 for archiving or access/playback on that client device.

The application and registry can also be used as a "gatekeeper" of sorts, wherein access to first device (internal or external to the embedded device 300) by one or more other devices is controlled or arbitrated by the application. For example, where downloaded application invokes PVR functionality, it may be desirable to stream portions of archived content (such as that stored in an external mass storage device) into device 300 RAM or alternatively local mass storage 306 within the device via, e.g., the aforementioned USB or 1394 interface.

More generally, the present invention is compatible with any hardware/firmware/software asset available to the device 300 (either directly, or indirectly such as through one or more of its interfaces 308) that a downloaded or resident application might require access to in a standardized, shareable fashion.

Furthermore, the hardware registry of the present invention can be readily adapted to multi-application access environments; i.e., where two or more applications are running on the device 300 and require access to one or more of the available hardware options. In this configuration, the hardware registry object can be made part of a resource contention or allocation mechanism of the type known in the software arts for resolving any such contentions between applications. For example, a round-robin system can be employed for resource allocation. Alternatively, a priority based system can be utilized. As yet another alternative, a collision detection and back-off system (i.e., where applications desiring a resource attempt to obtain the resource on a "first come, first served" basis until the resource is released. The OCAP standard defines exemplary approaches to this issue in the context of OpenCable-compliant systems.

The hardware registry of the present invention can also advantageously be used without interfering with other functions resident in the CPE, such as for example the event logging systems described in co-owned U.S. patent application Ser. No. 10/722,206 filed contemporaneously herewith and entitled "METHODS AND APPARATUS FOR EVENT LOGGING IN AN INFORMATION NETWORK", issued as U.S. Pat. No. 7,266,726 on Sep. 4, 2007 and incorporated herein by reference in its entirety. For example, events or errors generated through access or manipulation of the hardware registry described herein (such as a hardware failure or contention deadlock) can be stored and accessed as desired by a network agent in order to troubleshoot such errors, and potentially obviate service calls relating thereto.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

APPENDIX I

EXEMPLARY JAVA CODE

© 2003 Time Warner Cable, Inc. All rights reserved.

```java
public abstract class HardwareRegistry
{
        // This is the singleton hardware registry
        private static HardwareRegistry hwRegistry= null;
        // Prevents an application from instantiating a Hardware Registry
        protected HardwareRegistry( ) {}
        // Get the singleton instance of the hardware registry, create it only if necessary.
        public HardwareRegistry getInstance( )
        {
                if(hwRegistry != null)
                        return hwRegistry;
                else {
                        // take steps to instantiate the hwRegistry, well known in the arts
                        return hwRegistry;
                }
        }
        // Lookup any hardware options belonging to a hardware option type
        public HardwareOption [ ] findHardwareOptions(String optionTypeName)
        {
                // Take steps to search the hardware registry database for optionTypeName
                // Return null if not found or the array of found hardware options,
        }
}
```

APPENDIX I-continued

EXEMPLARY JAVA CODE

```
public Interface HardwareOption
{
        // Get the well known string representing the hardware option type
        public String getOptionTypeName( );
        // Get the name of any emedded device type specific association
        public String getOptionAssociationName( );
        // Get the name of the Java permission required to call getAPI
        public String getOptionPermission( );
        // Get a reference to the API that accesses the actual hardware
        // associated with the option
        public Object getAPI( );
        // get the version number of the API
        public int getVersionNumber( );
}
```

What is claimed is:

1. Third party consumer premises equipment (CPE) including a processor, said CPE for use within a content-based network, said CPE comprising:
    a plurality of proprietary and optional hardware features consisting comprising at least one of: digital video recorder (DVR) features, and/or digital video interface (DVI) features;
    a software application having a first application programming interface (API) associated therewith;
    OpenCable (OCAP) compliant middleware adapted to communicate with said software application and said hardware features via a plurality of second APIs; and
    a hardware registry having a plurality of entries associated therewith individual ones of said entries relating at least of said second APIs to respective ones of said hardware features;
    wherein said CPE is further adapted to download from said network and run said software application, said software application configured to:
        discover said hardware registry, said plurality of entries and said plurality of second APIs;
        access at least one of said proprietary and optional hardware features via at least one of said plurality of second APIs; and
        selectively control said at least one hardware feature using said application;
    wherein said third party CPE is configured to be utilized within a multiple systems operator (MSO) network; and
    wherein said download of said software application configured to discover, access and selectively control comprises a download from said network after installation of said CPE with a consumer premises.

2. Apparatus for operation within a content distribution network, said apparatus comprising:
    a processor;
    a storage device operatively coupled to said processor;
    first software running on said processor and adapted to control at least one function within said apparatus via a first software interface; and
    at least one second software application running on said processor;
    wherein said first software is configured to:
        (a) maintain a registry of hardware options within said apparatus, wherein said registry comprises a plurality of records relating said hardware options to individual ones of a plurality of second software interfaces which may be used to access each; and
        (b) provide access to said hardware options to said at least one second software application via said plurality of second software interfaces.

3. The apparatus of claim 2, further comprising a network interface operatively coupled to said processor;
    wherein said first software is further adapted to communicate with an external entity via said first software interface.

4. The apparatus of claim 2, wherein said processor comprises an embedded processor, and said storage device comprises an embedded memory.

5. The apparatus of claim 2, wherein said storage device comprises a hard disk drive (HDD).

6. The apparatus of claim 2, wherein said network comprises a multi-channel distribution network of the hybrid fiber type, and said at least one hardware option comprises digital video recorder (DVR) functionality.

7. The apparatus of claim 6, wherein said DVR functionality further comprises personal video recorder (PVR) functionality.

8. A method of operating a content distribution network having a plurality of client devices operatively coupled thereto, the method comprising:
    distributing at least one software application to each of said plurality of client devices;
    providing at least one hardware registry within each of said client devices, said hardware registry containing a plurality of records, each record relating individual ones of a plurality of optional hardware associated with respective ones of said client devices to one or more of a plurality of first software interfaces;
    providing said plurality of first software interfaces, wherein said plurality of first software interfaces being configured to interface between said at least one software application and at least one of said plurality of optional hardware;
    running said at least one software application;
    discovering said at least one hardware registry and said at least one software interface of said plurality of first software interfaces with a second software interface associated to said at least one software application; and
    responsive to said discovering, controlling said at least one hardware option using said at least one software application and said at least one of said plurality of first software interfaces.

9. Digital video recorder (DVR)-enabled consumer premises equipment (CPE) for use in a content-based network, wherein said DVR functionality is provided according to the method comprising:

providing at least one hardware registry within said CPE, wherein said hardware registry contains at least one record, wherein said record associates said DVR hardware to at least one of a plurality of first software interfaces;

providing said at least one of plurality of software interfaces within said CPE, said at least one of plurality of software interfaces being configured to interface between at least one software application running on said CPE and said DVR hardware;

running said at least one software application;

discovering said at least one hardware registry, said at least one record and associated said at least one of said plurality of software interfaces using a second software interface associated with said at least software application; and responsive to said discovering, controlling said DVR hardware using said software application and said at least one software interface;

wherein said act of controlling comprises implementing one or more user-specified rules provided to said application relating to the playback of content from said DVR hardware.

10. The CPE of claim 9, wherein said at least one software interface comprises an application programming interface (API).

11. The CPE of claim 9, wherein said at least one software interface is associated with OCAP-compliant middleware running on said CPE, and said application comprises a Java-based application adapted to make calls to objects within said middleware.

12. The CPE of claim 11, wherein said registry comprises a database having records each with a plurality of fields and each relating to a specific one of a plurality of hardware options, said plurality of hardware options including said DVR hardware.

13. A method of operating a consumer electronics device having middleware and a hard drive in data communication with said middleware, comprising:

providing two or more applications adapted to run on said device and in conjunction with said middleware;

disposing a hardware registry having at least one digital video recorder (DVR) functionality record disposed therein, said at least one record further identifying a first Application programming interface (API) for interface with said DVR functionality;

receiving contending requests for accessing said hardware registry from said two or more applications;

resolving said contending requests, thereby enabling one of said two or more applications to access said registry at a time via a second API; and controlling said DVR functionality via said first API to record at least a portion of content streamed to said device from an external source on said hard drive.

14. The method of claim 13, wherein said act of accessing said registry comprises (i) discovering said registry; (ii) accessing said registry to identify said at least one DVR record; and (iii) accessing said at least one DVR record to identify said at least one API.

15. In a cable network, a method of operating a consumer premises device having middleware, a hardware registry having a digital video recorder (DVR) functionality record identifying first application programming interface (API) for interface with said DVR functionality, and a hard drive in data communication with said middleware, the method comprising:

providing, from said cable network, a DVR-based application adapted to run on said device and in conjunction with said middleware;

accessing said registry using a second API associated with said DVR-based application to identify said first API from said record identifying said first API as associated with said DVR functionality; and selectively controlling said DVR functionality via said first API to store at least a portion of first entertainment content provided to said device on said hard drive for subsequent use by a consumer;

wherein said consumer premises device comprises a device not associated with said cable network, and said act of controlling is performed by said DVR-based application.

16. The method of claim 15, wherein said method further comprises simultaneously:

storing a second at least portion of second entertainment content on said hard drive; and watching, via viewing apparatus operatively connected to said consumer premises device, third entertainment content.

* * * * *